US008612571B2

(12) United States Patent
Gemelos et al.

(10) Patent No.: US 8,612,571 B2
(45) Date of Patent: Dec. 17, 2013

(54) AUDIO CONTENT IDENTIFICATION SYSTEM AND METHODS THEREOF

(75) Inventors: Steven Gemelos, San Jose, CA (US); Anthony P. Petronelli, San Jose, CA (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 790 days.

(21) Appl. No.: 12/059,491

(22) Filed: Mar. 31, 2008

(65) Prior Publication Data
US 2009/0248785 A1 Oct. 1, 2009

(51) Int. Cl.
*G06F 15/173* (2006.01)
(52) U.S. Cl.
USPC ........... 709/224; 709/201; 709/203; 709/223; 725/18; 725/19
(58) Field of Classification Search
USPC ................................................ 709/223–226
See application file for complete search history.

(56) References Cited

U.S. PATENT DOCUMENTS

| 6,662,231 | B1* | 12/2003 | Drosset et al. | 709/229 |
|---|---|---|---|---|
| 2002/0099555 | A1* | 7/2002 | Pitman et al. | 704/500 |
| 2003/0018966 | A1* | 1/2003 | Cook et al. | 725/2 |
| 2003/0236907 | A1* | 12/2003 | Stewart et al. | 709/231 |
| 2004/0196842 | A1* | 10/2004 | Dobbins | 370/389 |
| 2004/0210628 | A1* | 10/2004 | Inkinen et al. | 709/201 |
| 2007/0180465 | A1 | 8/2007 | Ou et al. | |
| 2007/0266403 | A1 | 11/2007 | Ou et al. | |
| 2008/0016540 | A1 | 1/2008 | Savoor et al. | |
| 2008/0069002 | A1 | 3/2008 | Savoor et al. | |
| 2008/0071792 | A1 | 3/2008 | Li et al. | |
| 2009/0083369 | A1* | 3/2009 | Marmor | 709/203 |

\* cited by examiner

*Primary Examiner* — Ian N Moore
*Assistant Examiner* — Jackie Zuniga
(74) *Attorney, Agent, or Firm* — Akerman LLP; Michael K. Dixon; Roy P. Zachariah

(57) ABSTRACT

A method of determining the number of recipients for an audio content item includes receiving a packet associated with the audio content item at a network monitoring device. The monitoring device includes a packet inspection module that analyzes a data payload of the packet to identify the audio content item. In an embodiment, the packet inspection module identifies the audio content item by determining an audio signature based on the payload, and comparing the signature to a set of known signatures. Once the audio content item is identified, an indicator is recorded to indicate that the content item was communicated. By aggregating the recorded indicators, the number of recipients for the audio content item is determined.

23 Claims, 4 Drawing Sheets

| | 302 | 304 | 306 |
|---|---|---|---|
| | CONTENT ITEM | CONTENT SOURCE | NUMBER OF RECIPIENTS |
| 308 | SONG1 | BROADCASTER 1 | 25,000 |
| 310 | SONG2 | BROADCASTER 2 | 12,000 |
| 312 | SONG1 | BROADCASTER 1 | 13,500 |
| 314 | SONG2 | BROADCASTER 3 | 60,000 |

AUDIO CONTENT IDENTIFICATION SYSTEM AND METHODS THEREOF

FIELD OF THE DISCLOSURE

The present disclosure generally relates to network monitoring devices, and more particularly relates to audio content monitoring devices.

BACKGROUND

Audio content is readily available via wide area networks. In particular, Internet radio has become increasingly popular. However, because of the complexity of wide area networks, it is difficult for content owners to accurately determine the number of recipients for particular content items. For example, Internet radio content is typically provided to a user via an information stream and multiple content items (e.g. songs) are provided in the stream. It is difficult to accurately determine when the user has terminated the stream, and therefore difficult to determine which content items have been provided to the user.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

A method of determining the number of recipients for an audio content item includes receiving a packet associated with the audio content item at a network monitoring device. The monitoring device includes a packet inspection module that analyzes a data payload of the packet to identify the audio content item. In an embodiment, the packet inspection module identifies the audio content item by determining an audio signature based on the payload, and comparing the signature to a set of known signatures. Once the audio content item is identified, an indicator is recorded to indicate that the content item was communicated. By aggregating the recorded indicators, the number of recipients for the audio content item is determined.

Figure 1:
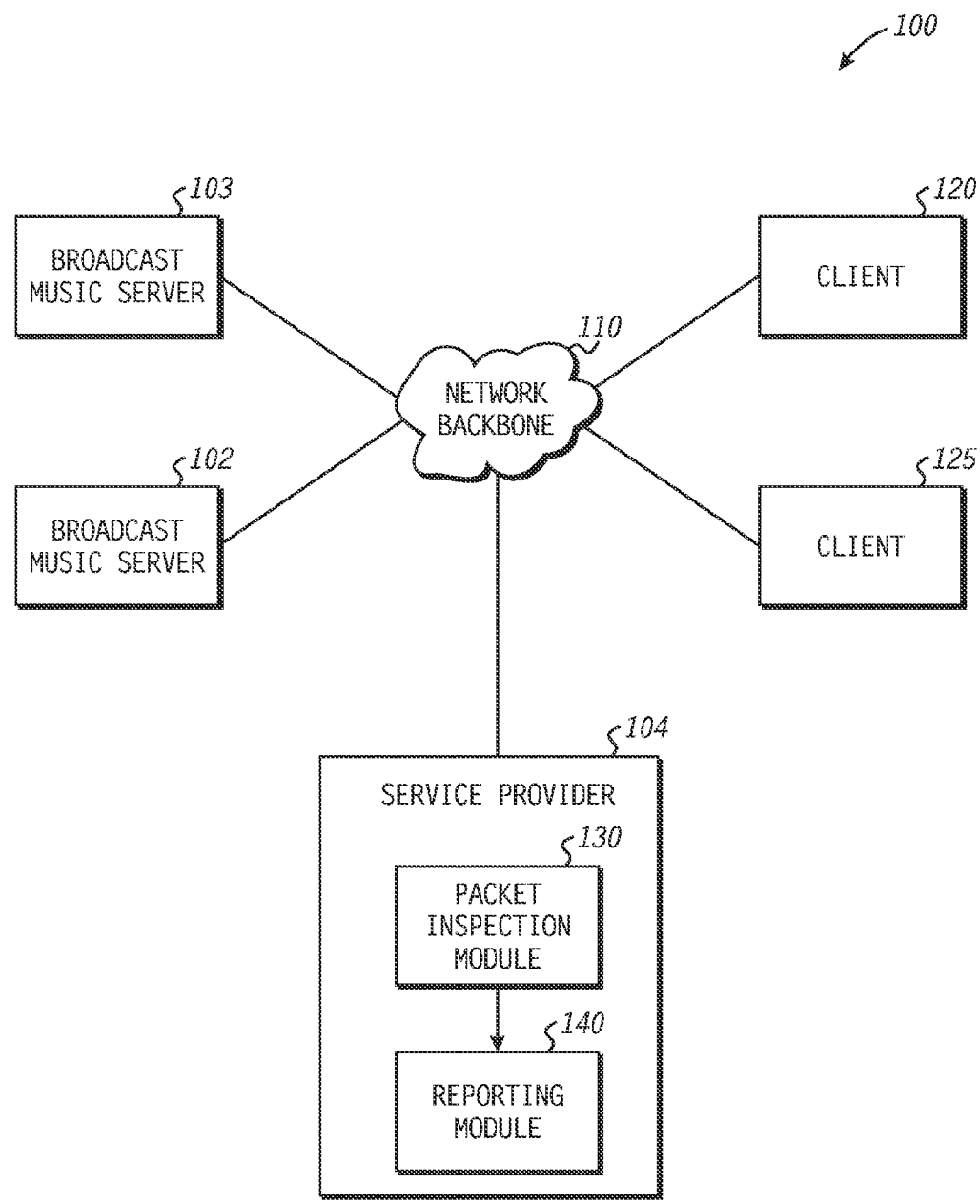
FIG. 1 is a block diagram of a data network in accordance with one embodiment of the present disclosure.

FIG. 1 illustrates a particular embodiment of a data network 100, including a broadcast music server 102, a broadcast music server 103, a client device 120, a client device 125, a network backbone 110, and a service provider 104. Each of the client devices 120 and 125, the broadcast music servers 102 and 103, and the service provider 104 are connected to the network backbone 110.

The network backbone 110 may include servers, routers, and other equipment to provide communication paths between the client computers 106 and 108, the video content servers 102 and 104, and the collected content server 120. The network backbone 110 provides a wide area network, and can also be part of a larger wide area network such as the Internet. The network backbone 110 is a packet-switched network that communicates information via a series of packets. Each packet includes a header and data payload. The header includes information indicating the source and destination of the packet in the network. Such information can include Internet Protocol (IP) addresses for the source and destination, a port number for the destination, or the like. The data payload includes information for an application at the destination. For example the data payload of an audio packet includes audio information that can be interpreted by an application at the destination to play audio content associated with the packet.

The broadcast music servers 102 and 103 are each data processing devices configured to provide audio content via the network backbone 110 in response to received requests. In an embodiment, the broadcast music servers 102 and 103 are streaming audio servers, such as Internet radio servers, that provide audio content items in streaming fashion. For example, the broadcast music server 102 can be an Internet radio server that offers a number of different audio streams. Each audio stream can be associated with a different "station" or type of audio content. Thus, one stream can be associated with jazz music, while another stream is associated with rock music. In response to receiving a packet from the network backbone 110 indicating a request for a particular audio stream, the broadcast music server 102 analyzes the packet header to determine the address of the requesting device. The broadcast music server 102 then forms packets with data payloads representing the audio stream and with headers indicating the requesting device as the packets' destination. The packets are provided to the network backbone 110 for transmission to the requesting device. Further, the broadcast music server 102 continues to create and communicate packets based on the requested stream until it determines that the requesting device no longer desires the stream. In an embodiment, the broadcast music server 102 periodically polls the requesting device to determine if the program that requested the stream is still active and, if not, terminates communication of the stream.

Each audio stream communicated by the broadcast music servers 102 and 103 can include multiple audio content items. As used herein, an audio content item refers to a particular music content item (e.g. song), audio program, or other unit of audio information. Accordingly, each packet in an audio stream can be associated with a particular content item. In particular, the data payload of a packet of the audio stream will include audio information indicative of a particular audio content item. For example, the pattern of data of a packet can reflect a pattern of audio information, which will indicate a particular pitch, melody, frequency, or other audio characteristic of the audio content item.

The client devices 120 and 125 are data processing devices, such as computer devices, cellular or mobile telephones, personal data assistants, or the like. The client devices 120 and 125 are configured to request audio streams from the broadcast music servers 102 and 103 and to play received audio content. For example, the client device 120 can be configured to execute a web browser application that can access a web site provided by the broadcast music server 103 via the network backbone 110. The web site can provide a list of available audio streams. In response to selection of a stream, the client device 120 can form one or more packets indicating a request for the selected stream, and provide the packets via the network backbone 110. In response to receiving packets associated with the stream, the client device 120 decodes and processes the packets to form the audio content items of the stream. For example, each audio content item can be composed of multiple packets. That is, an audio content item can be spread across multiple packets, such that the data payload of each packet represents a portion of the audio content item. The client device 120 retrieves the data payload from each received packet and assembles the audio content items for playback or storage. In an embodiment, the client device 120 is able to play back received audio content items in a streaming fashion, and so can begin playback of the item before receiving all packets associated with that item.

The service provider 104 provides access to the network backbone 110 to customers, such as users of the client devices 120 and 125. Accordingly, the service provider 104 implements services to enhance a customer's ability to both retrieve multimedia content from and communicate via the network backbone 110. Such services can include providing a customer device with an entry point to the network backbone 110, providing a security and authentication layer for content providers, providing billing and accounting services, or the like. In one embodiment, the service provider 104 also provides the network backbone 110 for communications. In another embodiment, the network backbone 110 is provided by another service provider or other entity.

The service provider 104 includes a packet inspection module 130 and a reporting module 140. The packet inspection module 130 is a data processing device, such as a server, that monitors and analyzes packets that flow through the network backbone 110. In a particular embodiment, the packet inspection module 130 is configured to perform Deep Packet Inspection (DPI) for one or more packets communicated via the network backbone 110. As used herein Deep Packet Inspection refers to an analysis of the data payload of a packet to determine the type of data associated with the payload, as well as characteristics of the data. In addition, the packet inspection module 130 can analyze packet headers to determine packet destinations, sources, and other information.

In the illustrated embodiment of FIG. 1, the packet inspection module 130 is configured to identify packets associated with audio content items. In particular, the packet inspection module 130 uses DPI to examine packets communicated via the network backbone 110. If the inspection indicates that the packet is associated with an audio stream provided by one of the broadcast music servers 102 and 103, the packet inspection module 130 provides information about the packet to a reporting module 140.

The reporting module 140 is configured to determine audio content items based on information received from the packet inspection module 130. In a particular embodiment, the packet inspection module 130 provides the data payload of one or more packets associated with an audio content item. The reporting module 140 analyzes the data patterns of the data payloads to identify audio content items being communicated via audio streams. The reporting module 140 also determines, based on the header information of the received packets, the number of unique destinations associated with each audio content item from a particular source. This information provides an indication of the number of recipients for an audio content item provided by a source (i.e. one of the broadcast music servers 102 and 103). Such information is referred to herein as popularity information.

The reporting module 140 is further configured to create reports based on the popularity information. As used herein, a report refers to a compilation of information for analysis or billing purposes. Further, a report can be a physical document, stored file, a set of data communicated via a network, or other compilation of data. The reports created by the reporting module 140 reflect the popularity (i.e. number of recipients) for each audio content item provided by the broadcast music servers 102 and 103. Further, because the reports are based on inspection of communicated packets, they will provide a more accurate assessment of the number of recipients than an analysis of web site hits or other conventional estimating methods.

Figures 2, 3:
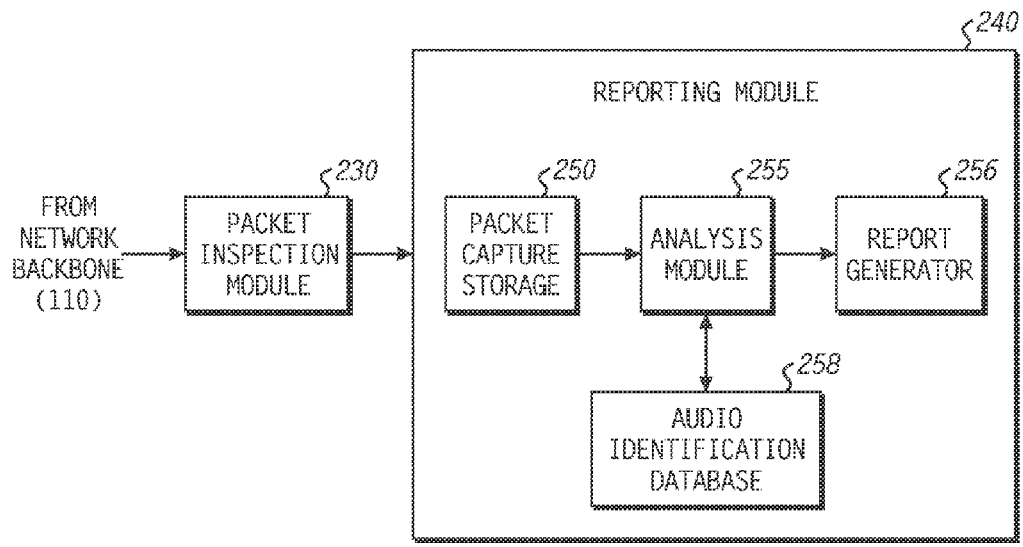
FIG. 2 is a block diagram illustrating details of a particular embodiment of the reporting module of FIG. 1.
FIG. 3 is a diagram illustrating an audio content report in accordance with one embodiment of the present disclosure.

FIG. 2 illustrates a block diagram of a particular embodiment of a packet inspection module 230, corresponding to the packet inspection module 130 of FIG. 1, and a reporting module 240, corresponding to the reporting module 140 of FIG. 1. As illustrated, the reporting module 240 includes packet capture storage 250, an analysis module 255, an audio identification database 258, and a report generator 256.

In the illustrated embodiment, the packet inspection module 230 receives packets from the network backbone 110 and inspects a header and data payload of each packet. Based on this inspection, the packet inspection module 230 identifies packets representing audio content items and provides those packets to the reporting module 240. The reporting module 240 stores the provided packets at the packet capture storage 250. In one embodiment, the packet capture storage 250 is non-volatile memory such as a hard disk, solid state disk, flash memory and the like.

The audio identification database 258 stores audio signatures representing particular audio content items. In an embodiment, each audio signature is represented by a data pattern. The data pattern can represent all of, or a portion of, the associated audio content item. In addition, the audio identification database 258 can be searchable, whereby it receives a data pattern and in response provides information about an audio content item associated with the pattern.

The analysis module 255 is configured to access stored packets at the packet capture storage 250 and to determine a pattern of audio data based on the accessed packets. Accordingly, the analysis module 255 will access one or more packets associated with an audio content item. The analysis module 255 can assemble the data payloads for the accessed packets into a pattern of audio data representative of the associated audio content item. The analysis module 255 provides the data pattern to the audio identification database 258, and in return receives an identifier for the associated audio content item. The identifier can be a name, identifier code, or other information that identifies the audio content item.

In addition, the analysis module 255 can determine, based on header and data payload information of the retrieved packets, a source and destination for each packet. Based on this information, the analysis module 255 can determine which of the broadcast music servers 102 and 103 provided the audio content item, as well as which of the client devices 120 and 125 is the recipient of the audio content item. The analysis module 255 provides the identifier for the audio content item, as well as the associated source and destination information to the report generator 256.

The report generator 256 is configured to receive the information provided by the analysis module 255. Based on the received information, the report generator 256 creates reports indicating the number of recipients of a particular audio content item provided by a particular source. A particular embodiment of a report 300 is illustrated in FIG. 3. The report 300 includes a content item field 302, a content source field 304, and a number of recipients field 306. The content item field 302 includes an identifier for a particular audio content item, while the content source field 304 indicates the source of the associated audio content item and the number of recipients field 306 indicates the number of recipients of the associated content item for the identified source. For example, row 308 indicates that the audio content item "Song1", as provided by the source "Broadcaster1" had 25,000 recipients. That is, the audio content item Song1 was provided by Broadcaster 1 to client devices 25,000 times.

It will be appreciated that the value in recipients field 306 does not necessarily identify the number of unique recipients of a particular audio content item. For example, a single client device could receive an audio content item from a particular source multiple times, and each time the audio content item is provided the client device can be identified as a recipient of the item.

As illustrated, the report 300 can identify the number of recipients for the same audio content item as provided by different sources. Thus, row 308 indicates that 25,000 recipients received the audio content item Song1 from the content source Broadcaster1, while row 310 indicates 12,000 recipients received the same item from the content source Broadcaster2. Similarly, row 312 indicates that 13,500 recipients received the audio content item Song2 from Broadcaster1, while row 314 indicates 60,000 recipients received the same item from the content source Broadcaster3.

The report 300 can be generated according to one or more report constraints, such as time, geographic area, or the like. For example, the report 300 can be created to reflect the number of recipients of particular content items in a particular unit of time, such as an hour, day, month, or the like. Thus, the number of recipients field 306 will indicate the number of recipients for the associated content item from the associated source in the designated unit of time. Similarly, the report 300 can be created to reflect the number of recipients in a particular geographic area (e.g. a particular state, country, continent, or the like). In this case, the number of recipients field 306 will indicate the number of recipients in the designated geographic area that received the associated content item from the associated content source. It will be appreciated that the constraints can be combined so that, for example, the number of recipients field 306 indicates the number of recipients in a designated geographic region over a designated period of time.

The report 300 can be used in a number of ways. In one embodiment, the number of recipients field 306 can be used to determine royalties due from an associated content source. For example, the owner of Song1 could use the report 300 to determine a royalty amount due from Broadcaster1 and Broadcaster2 based on the associated number of recipients for each content source. In another embodiment, the report 300 can be used by content providers to determine the number of recipients for particular content items relative to other content providers. In addition, by applying geographic area constraints to the report 300, the content provider can determine numbers of recipients in different regions.

Figure 4:
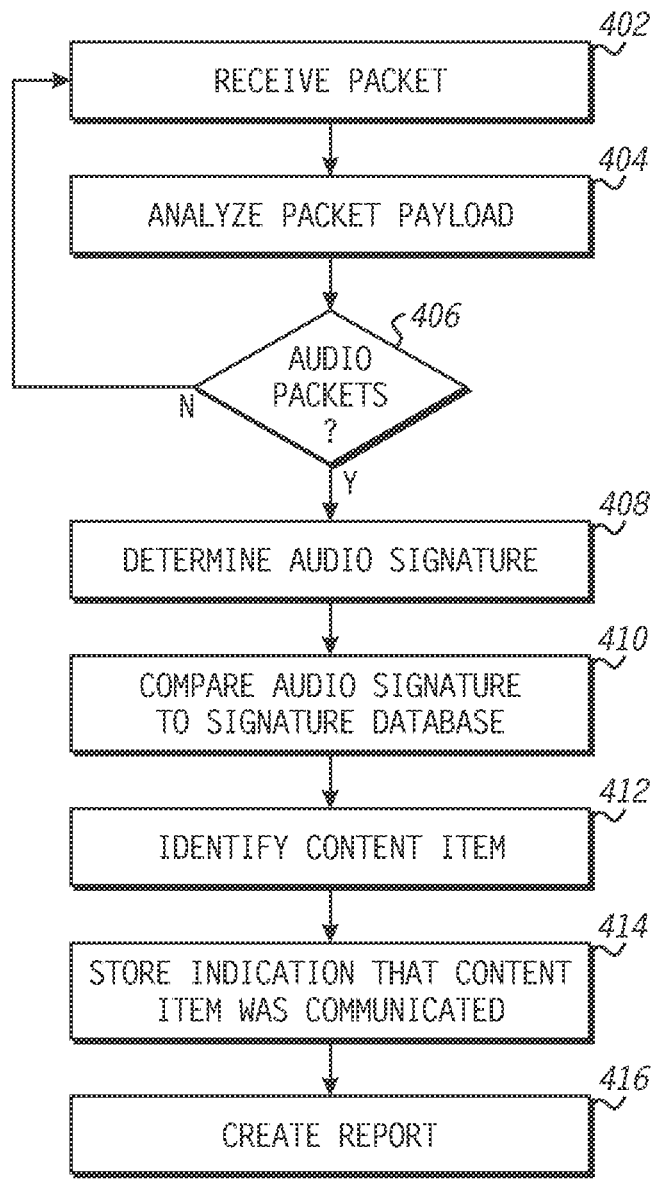
FIG. 4 is a flow diagram of a method of creating an audio content report in accordance with one embodiment of the present disclosure.

FIG. 4 illustrates a flow diagram of a method for generating an audio content report, such as the report 300 of FIG. 3. At block 402, a packet is received from a network backbone. At block 404, a data payload of the packet is analyzed to determine whether the packet is associated with an audio content item. In an embodiment, the analysis can be based on both the data payload and header of the packet. At block 406, it is determined if the received packet is associated with audio content. If not, the method flow returns to block 402 to await another packet.

If, at block 406, it is determined that the received packet is associated with an audio content item, the method flow moves to block 408 and the data payload of the packet is analyzed to determine an audio signature for the associated audio content item. In an embodiment, the audio signature is reflected by a data pattern of the data payload, and the audio signature is determined by identifying the data payload. At block 410, the determined audio signature is compared to a set of audio signatures at a signature database. Based on this comparison, at block 412 the audio content item associated with the received packet is identified. In addition, based on the packet header, a source and destination for the audio content item can be identified.

At block 414, an indication is stored that the audio content item was communicated to a destination. The indication can be indexed according to a particular source. Accordingly, by aggregating indications that a content item from a particular source was communicated, the popularity of particular audio content items from particular sources can be determined. At block 416, an audio content report, such as the report 300 of FIG. 3 is created based on the aggregated indications.

Figure 5:
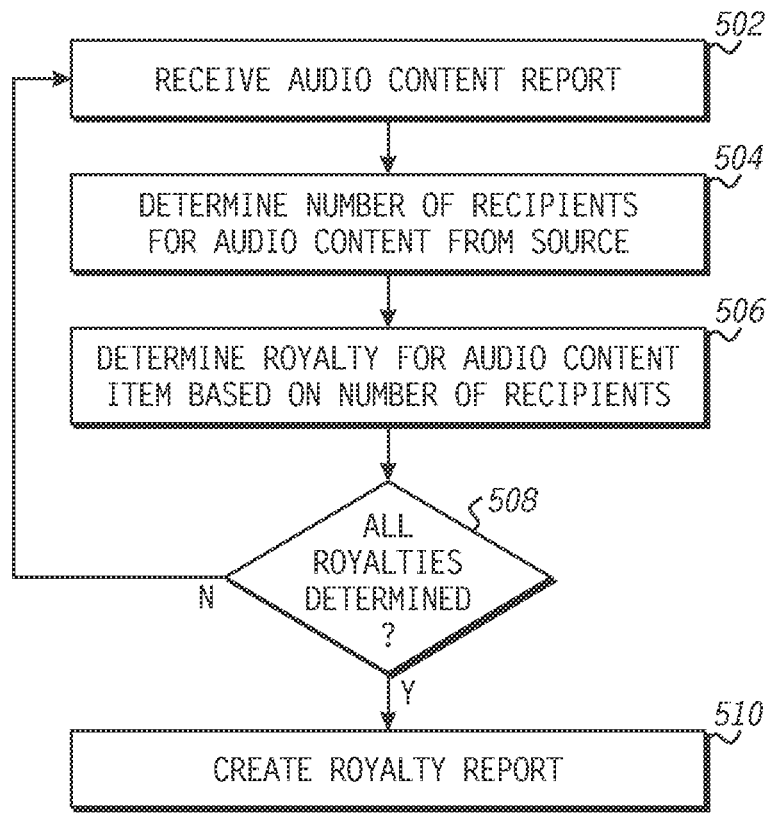
FIG. 5 is flow diagram of a method of determining royalties based on an audio content report in accordance with one embodiment of the present disclosure.

FIG. 5 illustrates a flow diagram of a particular embodiment of a method of determining royalties based on an audio content report. At block 502, an audio content report, such as the report 300 of FIG. 3, is received. At block 504, a number of recipients of an audio content item provided by a designated content source is determined. At block 506, a royalty is determined based on the determined number of recipients. In an embodiment the royalty is determined by multiplying a royalty rate with the determined number of recipients.

At block 508, it is determined whether all designated royalties have been determined. If not, the method flow returns to block 504 to determine the number of recipients for a different audio content item, a different content source, or both. If, at block 508, it is determined that all designated royalties have been determined, the method flow moves to block 510 and a royalty report is generated. The royalty report can be in the form of an invoice provided to a content source indicating royalty amounts due to the owner of designated audio content items.

Figure 6:
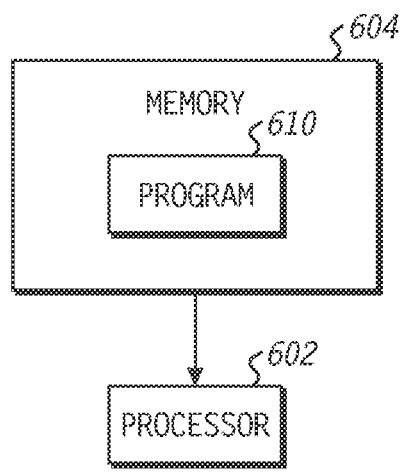
FIG. 6 is a block diagram of a data processing device in accordance with one embodiment of the present disclosure.

FIG. 6 shows a block diagram of a particular embodiment of a data processing device 600, representative of the packet inspection module 130 and the reporting module 140 of FIG. 1. The traffic monitoring device 530 includes a processor 602 connected to a memory 604. The memory 604 is a computer readable medium, and can be volatile memory, such as random access memory (RAM), or non-volatile memory, such as flash memory or a hard disk. The memory 604 stores a program 610 that includes instructions to manipulate the processor 602 in order to implement one or more of the methods described herein. For example, the program 604 can include instructions to manipulate the processor 602 to inspect packets received via the network backbone 110. Further, the program 602 can include instructions to manipulate the processor 545 to determine whether received packets represent audio content items, to identify those items, and to generate reports based on the received packets, as described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

What is claimed is:

1. A method, comprising:
    receiving, at a first data processing device and over a wide area network, a first packet of a plurality of packets from a second data processing device targeted to a third data processing device in response to a request for a first audio content item sent from the third data processing device to the second data processing device without the request for the first audio content item being sent through the first data processing device,
    wherein the first packet is associated with the first audio content item,
    wherein the second data processing device periodically polls the third data processing device and terminates the packets when a program at the third data processing device is determined not to be active based on periodically polling the third data processing device;
    determining the first audio content item based on a data pattern of a first data payload of the first packet, wherein the data pattern reflects a pattern of audio information of the packet, and wherein the audio information comprises a pitch, a melody, and a frequency; and
    storing, in response to determining the first audio content item based on the first data payload, a first indication that the first audio content item has been communicated.

2. The method of claim 1, wherein the first audio content item is a music content item.

3. The method of claim 1, wherein the second data processing device is associated with a music broadcast source.

4. The method of claim 3, wherein the music broadcast source is an internet radio source.

5. The method of claim 1, wherein the data pattern is indicative of an audio signature, and wherein determining the first audio content item comprises determining the first audio content item based on a comparison of the audio signature with a set of audio signatures.

6. The method of claim 1, wherein determining the first audio content item comprises determining based on the data payload that the first packet is indicative of a request for the first audio content item.

7. The method of claim 1, further comprising:
    determining, based on the first indication, a number of recipients associated with the first audio content item; and
    creating a report indicating the first audio content item and the number of recipients associated with the first audio content item.

8. The method of claim 7, wherein determining the number of recipients comprises determining the number of recipients based on a specified period of time.

9. The method of claim 7, wherein determining the number of recipients comprises determining the number of recipients based on a specified geographic region.

10. The method of claim 1, further comprising:
    receiving over the wide area network at the first data processing device a second packet from the second data processing device targeted to a fourth data processing device, the second packet associated with the first audio content item;
    determining the first audio content item based on a second data payload of the second packet; and
    in response to determining the first audio content item based on the second data payload, storing a second indication that the first audio content item has been communicated.

11. The method of claim 10, further comprising:
    determining, based on the first indication and the second indication, a number of recipients associated with the first audio content item; and
    creating a report indicating the first audio content item and the number of recipients associated with the first audio content item.

12. The method of claim 1, further comprising:
    receiving over the wide area network at the first data processing device a second packet from the second data processing device targeted to a fourth data processing device, the second packet associated with a second audio content item;
    determining the second audio content item based on a second data payload of the second packet; and
    in response to determining the second audio content item based on the second data payload, storing a second indication that the second audio content item has been communicated.

13. The method of claim 12, further comprising:
    determining, based on the first indication, a number of recipients associated with the first audio content item;
    determining, based on the second indication, a number of recipients associated with the second audio content item; and
    creating a report indicating the first audio content item and the number of recipients associated with the first audio content item, and further indicating the second audio content item and the number of recipients associated with the second audio content item.

14. The method of claim 1, further comprising:
    receiving over the wide area network at the first data processing device a second packet from a fourth data processing device targeted to a fifth data processing device, the second packet associated with a second audio content item;

determining the second audio content item based on a second data payload of the second packet; and in response to determining the second audio content item based on the second data payload, storing a second indication that the second audio content item has been communicated.

15. A method, comprising:

receiving, at a first data processing device and over a wide area network, a plurality of packets from a second data processing device, each of the plurality of packets associated with a corresponding audio content item, wherein the second data processing device periodically polls requesting devices that requested the packets from the second data processing device and terminates the plurality of packets when a program at each of the requesting devices is determined not to be active based on periodically polling the requesting devices;

determining the audio content item based on a data pattern of a data payload of each of the plurality of packets, wherein the data pattern reflects a pattern of audio information of the packet, and wherein the audio information comprises a pitch, a melody, and a frequency;

determining, based on the corresponding data payload for each of the plurality of packets, a number of recipients within a designated geographic region over a designated period of time for each audio content item associated with the plurality of packets; and storing an indication of the number of recipients within the designated geographic region over the designated period of time for each audio content item.

16. The method of claim 15, further comprising:

creating a report indicating the number of recipients for each audio content item.

17. The method of claim 15, wherein determining a number of recipients comprises:

determining an audio signature for each of the plurality of packets based on the corresponding data payload to obtain a plurality of audio signatures; and determining the number of recipients based on a comparison of the plurality of audio signatures with a set of audio signatures.

18. A method, comprising:

receiving, at a first data processing device and over a wide area network, a first packet of a plurality of packets from a second data processing device targeted to a third data processing device in response to a request for a first audio content item sent from the third data processing device to the second data processing device without the request for the first audio content item being sent through the first data processing device, wherein the first packet is associated with the first audio content item, wherein the second data processing device periodically polls the third data processing device and terminates the packets when a program at the third data processing device is determined not to be active based on periodically polling the third data processing device;

receiving an indication of a first number of recipients of the first audio content item, wherein the first number of recipients of the first audio content item is based on analysis of a data pattern of a data payload of a first packet associated with the first audio content item, wherein the data pattern reflects a pattern of audio information of the first packet, and wherein the audio information comprises a pitch, a melody, and a frequency;

determining a first royalty based on the indication of the first number of recipients;

generating a royalty report including the first royalty; and providing the royalty report as an invoice to a content source of the first audio content item.

19. The method of claim 18, wherein the first number of recipients is based on comparison of an audio signature of the data payload of the first packet to a set of pre-determined audio signatures.

20. The method of claim 18, further comprising:

receiving an indication of a second number of recipients of a second audio content item, the second number of recipients based on analysis of a data payload of a second packet associated with the second audio content item; and determining a second royalty based on the indication of the second number of recipients.

21. A computer readable device that stores instructions, which when loaded and executed by a processor cause the processor to perform operations comprising:

receiving, at a first data processing device and over a wide area network, a packet of a plurality of packets from a second data processing device targeted to a third data processing device in response to a request for an audio content item sent from the third data processing device to the second data processing device without the request for the audio content item being sent through the first data processing device, wherein the packet is associated with the audio content item, wherein the second data processing device periodically polls the third data processing device and terminates the packets when a program at the third data processing device is determined not to be active based on periodically polling the third data processing device;

determining the audio content item based on a data pattern of a data payload of the packet, wherein the data pattern reflects a pattern of audio information of the packet, and wherein the audio information comprises a pitch, a melody, and a frequency; and storing, in response to determining the audio content item, a first indication that the audio content item has been communicated.

22. The computer readable device of claim 21, wherein the data pattern is indicative of an audio signature, and wherein determining the audio content item comprises determining the audio content item based on a comparison of the audio signature with a set of audio signatures.

23. The computer readable device of claim 21, wherein determining the audio content item comprises determining the audio content item based on the data payload that the packet is indicative of a request for the first audio content item.

* * * * *